A. FELLHEIMER.

Assignor to S. WORMSER & Co.

Manufacture of Corsets.

No. 8,244. Reissued May 21, 1878.

Witnesses

John Becker

Fred. Haynes

Inventor

August Fellheimer by his Attorneys

Brown & Allen

N. PETERS, PHOTO-LITHOGRAPHER, WASHINGTON D. C.

UNITED STATES PATENT OFFICE.

AUGUST FELTHEIMER, OF NEW YORK, N. Y., ASSIGNOR TO S. WORMSER & CO., OF SAME PLACE.

IMPROVEMENT IN MANUFACTURE OF CORSETS.

Specification forming part of Letters Patent No. 201,764, dated March 26, 1878; Reissue No. 8,244, dated May 21, 1878; application filed May 9, 1878.

*To all whom it may concern:*

Be it known that I, AUGUST FELTHEIMER, of the city, county, and State of New York, have invented a new and useful Improvement in Woven Corsets; and I do hereby declare that the following is a full, clear, and exact description of same, reference being had to the accompanying drawing, forming part of this specification.

This invention relates to what are commonly known as "woven corsets"—that is to say, corsets which are woven without seam. Such corsets are woven in a continuous web, of which the warp runs in the direction of the girth of the corset, and the weft in a direction between the top and bottom of the corset. As, while the selvages of this web are parallel, the corset is not required to be so high over the bosom as over the back of the wearer, there is some material of the web to spare within the selvage of that part of the web of which the bosom is to be formed. This spare material is commonly all cut away and wasted. The object of this invention is to utilize this material, and at the same time to improve the set of the corset over the breast of the wearer; and with this end in view, instead of cutting out the whole of the spare material, I turn in the greater portion of it and stretch it down to form a hem or pocket along the edge of the corset-bosom, and insert into the said hem or pocket a piece of whalebone or other elastic stiffening material, which gives an elastic yet firm fullness along the said edge, and gives a firm support and shapely fullness of appearance to the breast of the wearer.

Figure 2:
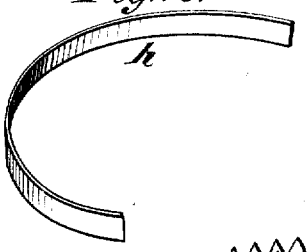
Figure 1:
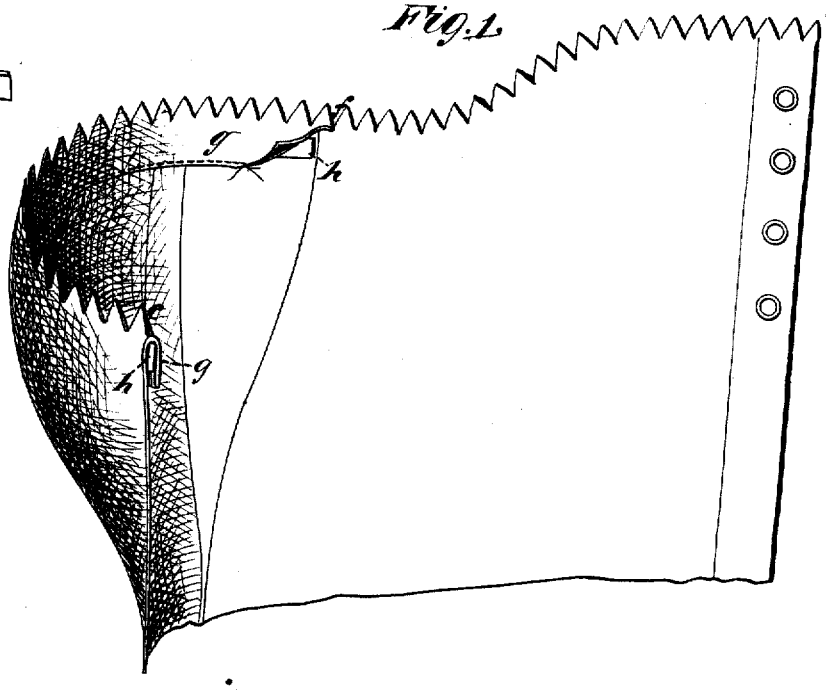
Figure 3:
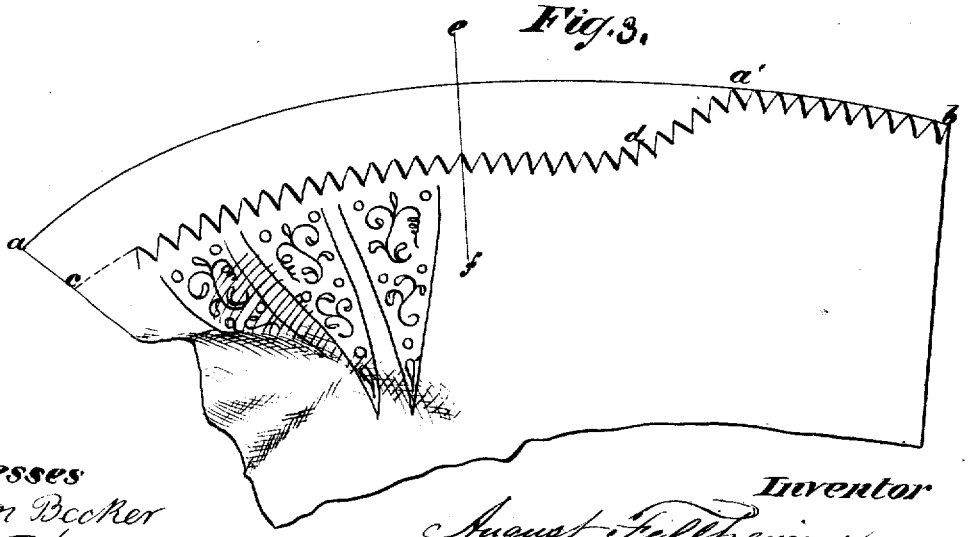

Figure 1 in the accompanying drawing represents an inner face view of the upper part of one-half of a corset having my improvement applied. Fig. 2 is a view of the stiffening-piece of whalebone hereinbefore mentioned. Fig. 3 is a face view of the upper part of the piece of woven web of which the half-corset is formed.

In Fig. 3 the line *a a′ b* represents the selvage of the web, and the line *c d a′ b* represents the line which will form the upper margin of the finished corset. The material included between *a c d a′* is what I have above referred to as the spare material which results from making the front part of the corset of less depth than the back, and which is ordinarily cut out and thrown away as waste, but the greater portion of which—viz., from *a c* to the line *e f*—I utilize by turning it in and sewing it down to form the hem or pocket *g*, (shown in Fig. 1,) into which I insert the piece of whalebone or other stiffening material, *h*, for stiffening and giving a full round shape to that part of the corset from *e* to *f* which receives the breast of the wearer. The small portion from *e f* to *a′* may also be turned in and stitched down, or may be cut out and thrown away, still leaving much the greater portion of the spare material to be utilized.

As the piece of stiffening material *h*, when of whalebone, is so short that it may be made of one of the waste pieces or cuttings which are always left from the cutting of the strips which are employed to give stiffness to other parts of the corset, the whole of my improvement is accomplished by the use of material which is commonly thrown to waste in the manufacture of woven corsets.

Corsets have heretofore been formed to fit and conform to the shape of the bosom, and held in such form by suitable springs; and I do not claim, broadly, such construction.

What I claim as my invention is—

The improvement in the manufacture of corsets, consisting in constructing a corset with its bosom stiffened and kept in shape by turning in a portion of the spare material within the selvage of the woven web to form a hem or pocket, *g*, and inserting a stiffening-piece into the hem or pocket so formed, substantially as herein described.

AUGUST FELTHEIMER.

Witnesses:
FRED HAYNES,
T. J. KEANE.

Correction in Reissue Letters Patent No. 8,244.

This is to certify that the annexed Letters Patent No. 8,244, (Reissue,) granted May 21, 1878, for Improvement in Manufacture of Corsets, have been corrected for the purpose of remedying a clerical error by erasing the name "Feltheimer" wherever it occurs throughout the said Letters Patent, viz: in the clause reciting the parties in title, in the heading of the drawing, and in the caption, in column 1, line 2, and at the close of column 2 of the printed specification accompanying and forming part of said Letters Patent, and in lieu thereof inserting at each of said several places the name Fellheimer, to agree with the original papers on file in this Office.

July 11, 1878.